United States Patent
Bryant et al.

(10) Patent No.: US 10,318,385 B2
(45) Date of Patent: Jun. 11, 2019

(54) SERVICE RECOVERY USING SNAPSHOTS AND INTERSERVICE MESSAGES

(71) Applicant: International Business Machines Corporation, Armonk, NY (US)

(72) Inventors: Jay S. Bryant, Rochester, MN (US); James E. Carey, Rochester, MN (US); Zachary Hill, Muskegon, MI (US); Kendall J. Nelson, St. Paul, MN (US); Lucas A. Palm, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 15/431,430

(22) Filed: Feb. 13, 2017

(65) Prior Publication Data

US 2018/0232283 A1 Aug. 16, 2018

(51) Int. Cl.
| | |
|---|---|
| G06F 11/00 | (2006.01) |
| G06F 11/14 | (2006.01) |
| G06F 9/54 | (2006.01) |
| G06F 11/34 | (2006.01) |
| G06F 9/455 | (2018.01) |

(52) U.S. Cl.
CPC .......... *G06F 11/1438* (2013.01); *G06F 9/541* (2013.01); *G06F 11/1469* (2013.01); *G06F 11/3476* (2013.01); *G06F 9/45533* (2013.01); *G06F 2201/84* (2013.01)

(58) Field of Classification Search
CPC ............. G06F 11/1438; G06F 11/1469; G06F 11/1446; G06F 11/1448; G06F 11/1451; G06F 11/1453; G06F 11/1471; G06F 9/541; G06F 9/45533; G06F 2201/84; G06F 11/3476
See application file for complete search history.

(56) References Cited

U.S. PATENT DOCUMENTS

| | | | |
|---|---|---|---|
| 7,373,364 B1* | 5/2008 | Chapman | G06F 11/1451 |
| 2009/0070536 A1* | 3/2009 | Nasre | G06F 17/30088 711/162 |
| 2010/0250499 A1 | 9/2010 | McAlister et al. | |
| 2011/0066653 A1* | 3/2011 | Uruma | G06F 21/552 707/783 |
| 2012/0096458 A1 | 4/2012 | Huang et al. | |
| 2015/0074055 A1* | 3/2015 | Jacoby | G06F 17/30088 707/639 |

(Continued)

OTHER PUBLICATIONS

"Transaction Log," Wikipedia, Aug. 2016, 2 pages.

(Continued)

*Primary Examiner* — Joseph D Manoskey
(74) *Attorney, Agent, or Firm* — VanLeeuwen & VanLeeuwen; David B. Woycechowsky

(57) ABSTRACT

An approach is provided in which an information handling system retrieves a snapshot of a first service in response to determining that the first service has failed. The snapshot was captured at a point in time prior to the failure of the first service. The information handling system retrieves a log corresponding to the first service that includes a log entry of a message sent between the first service and a second service that was sent subsequent to the capturing of the snapshot. In turn, the information handling system restores the first service using the snapshot and the message.

17 Claims, 8 Drawing Sheets

(56) References Cited

U.S. PATENT DOCUMENTS

| | | |
|---|---|---|
| 2015/0212844 A1 | 7/2015 | Tsirkin et al. |
| 2015/0381723 A1 | 12/2015 | Sancheti et al. |
| 2016/0110408 A1* | 4/2016 | Madhavarapu ... G06F 17/30578 707/615 |
| 2017/0060699 A1* | 3/2017 | Hohl .................. G06F 11/1469 |

OTHER PUBLICATIONS

"Backup and Journal Management for Efficient Database Recovery," Oracle Corporation, Jun. 2005, 43 pages.

Riehl, "Journaling Should Be Part of Your Backup and Recovery Plan," IBM Systems Magazine, Mar. 2002, 2 pages.

\* cited by examiner

Log A 330

```
2016-12-14 11:13:56.067 INFO [address] GET http://10.0.2.15:8776/v2/    ← 400
779005e51ccc4a07b1ace144a8aa59d3/volumes/detail 2016-12-14 11:13:56.068 DEBUG [address] Empty body provided in request from (pid=4046)
get_body /opt/stack/cinder/cinder/api/openstack/wsgi.py:718    ← 410

2016-12-14 11:13:56.139 INFO [address] http://10.0.2.15:8776/v2/
779005e51ccc4a07b1ace144a8aa59d3/volumes/detail returned with HTTP 200    ← 420

2016-12-14 11:14:31.653 INFO [address] POST http://10.0.2.15:8776/v2/    ← 430
779005e51ccc4a07b1ace144a8aa59d3/volumes 2016-12-14 11:14:31.655 DEBUG [address] Create volume request body: {u'volume': {u'status':
u'creating', u'size': 1, u'project_id': None, u'user_id': None, u'description': None, u'imageRef': None,
u'availability_zone': None, 'scheduler_hints': {}, u'multiattach': False, u'attach_status': u'detached',
u'volume_type': None, u'consistencygroup_id': None, u'source_volid': None, u'snapshot_id': None,
u'metadata': {}, u'source_replica': None, u'name':    ← 440
```

SERVICE RECOVERY USING SNAPSHOTS AND INTERSERVICE MESSAGES

BACKGROUND

The present disclosure relates to a mechanism of restoring failed services executing on virtual machines using snapshots and logged interservice API calls.

Computer systems employ virtual machines to perform various tasks such as services. Their implementations may involve specialized hardware, software, or a combination of hardware and software. To back up a virtual machine, a computer system captures "snapshots" of the virtual machine to preserve the state of the virtual machine at a point in time when the snapshot was taken. The snapshot includes state information of the virtual machine and may also include information of the virtual machine's storage devices. In turn, if the virtual machine fails, the computer system uses the snapshot to restore the virtual machine back to the point in time at which the snapshot was taken.

A service, as that term is used herein, refers to a piece of software that is executed to provide predetermined functionality(ies) (such as the retrieval of specified information or the execution of a set of operations). Typically, services are reused by different clients for different purposes. Typically, services include policies that should control usage of the service (for example, control based on the identity of the client requesting the service. Typically, a service provides a mechanism to access to one or more capabilities, where the access is provided using a prescribed interface and the access is performed to be consistent with constraints and policies as specified by a service description.

A snapshot, as that term is used herein, refers to a set of data that includes information indicative of the state of a system (such, as a service and/or the systems supporting a service) at a particular point in time. Typically, a snapshot includes information indicative of: (i) the system whose state is being captured; and (ii) the date/time at which the snapshot captured the state of the system.

Virtual machines that execute services send messages to each other via "interservice" application protocol interface (API) calls. A common API used by the virtual machines is a representational state transfer (REST) or RESTful API. The RESTful API is a web services-based API that provides interoperability between computer systems. REST-compliant web services allow requesting systems to access and manipulate textual representations of web resources using a uniform and predefined set of stateless operations. A virtual machine uses the RESTful API to send calls (requests) to another virtual machine that, in turn, may cause the other virtual machine to send a different API call to yet another virtual machine.

BRIEF SUMMARY

According to one embodiment of the present disclosure, an approach is provided in which an information handling system retrieves a snapshot of a first service in response to determining that the first service has failed. The snapshot was captured at a point in time prior to the failure of the first service. The information handling system retrieves a log corresponding to the first service that includes a log entry of a message sent between the first service and a second service that was sent subsequent to the capturing of the snapshot. In turn, the information handling system restores the first service using the snapshot and the message.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is an exemplary diagram depicting log file that includes log entries of interservice API calls;

DETAILED DESCRIPTION

Figure 1:
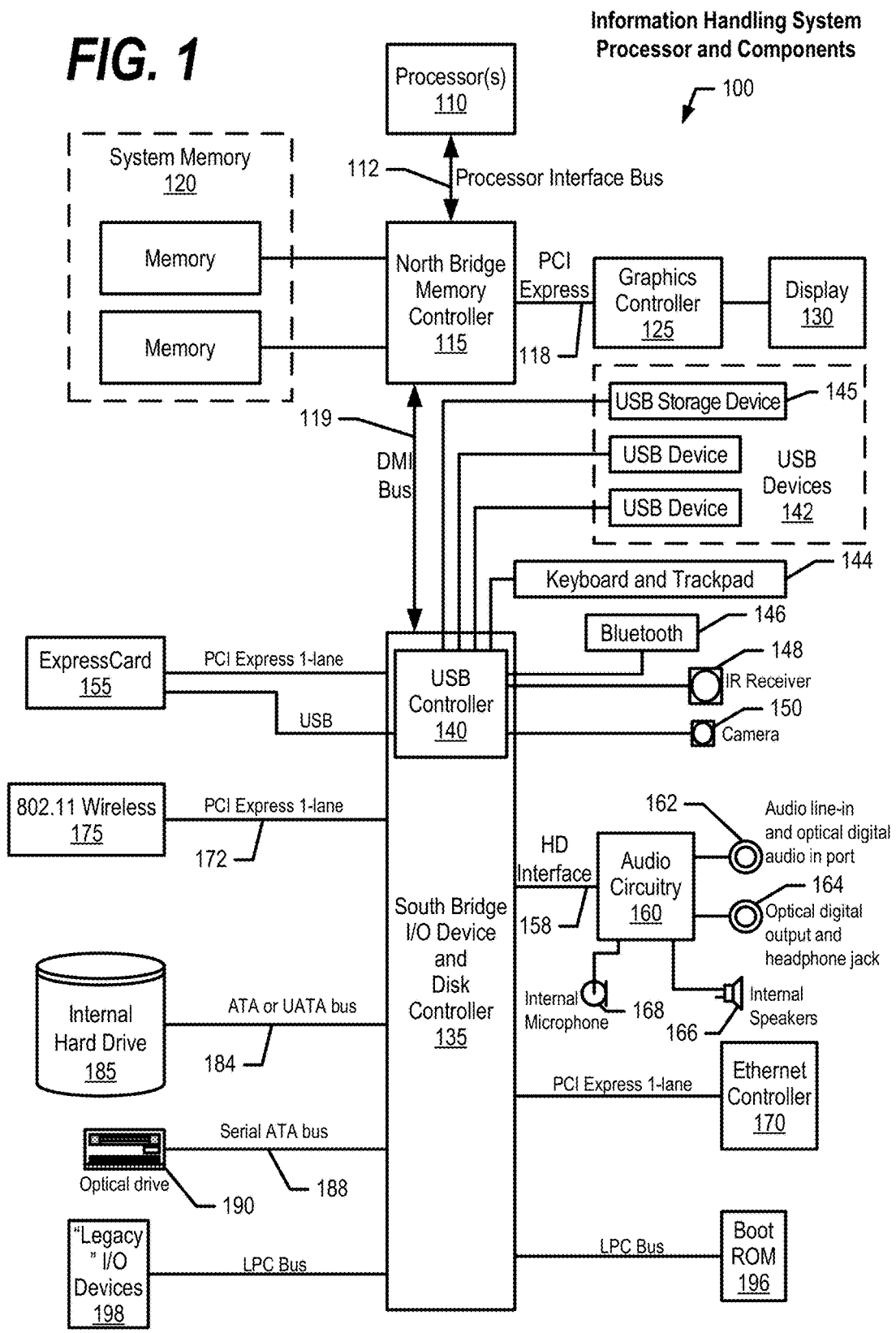
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
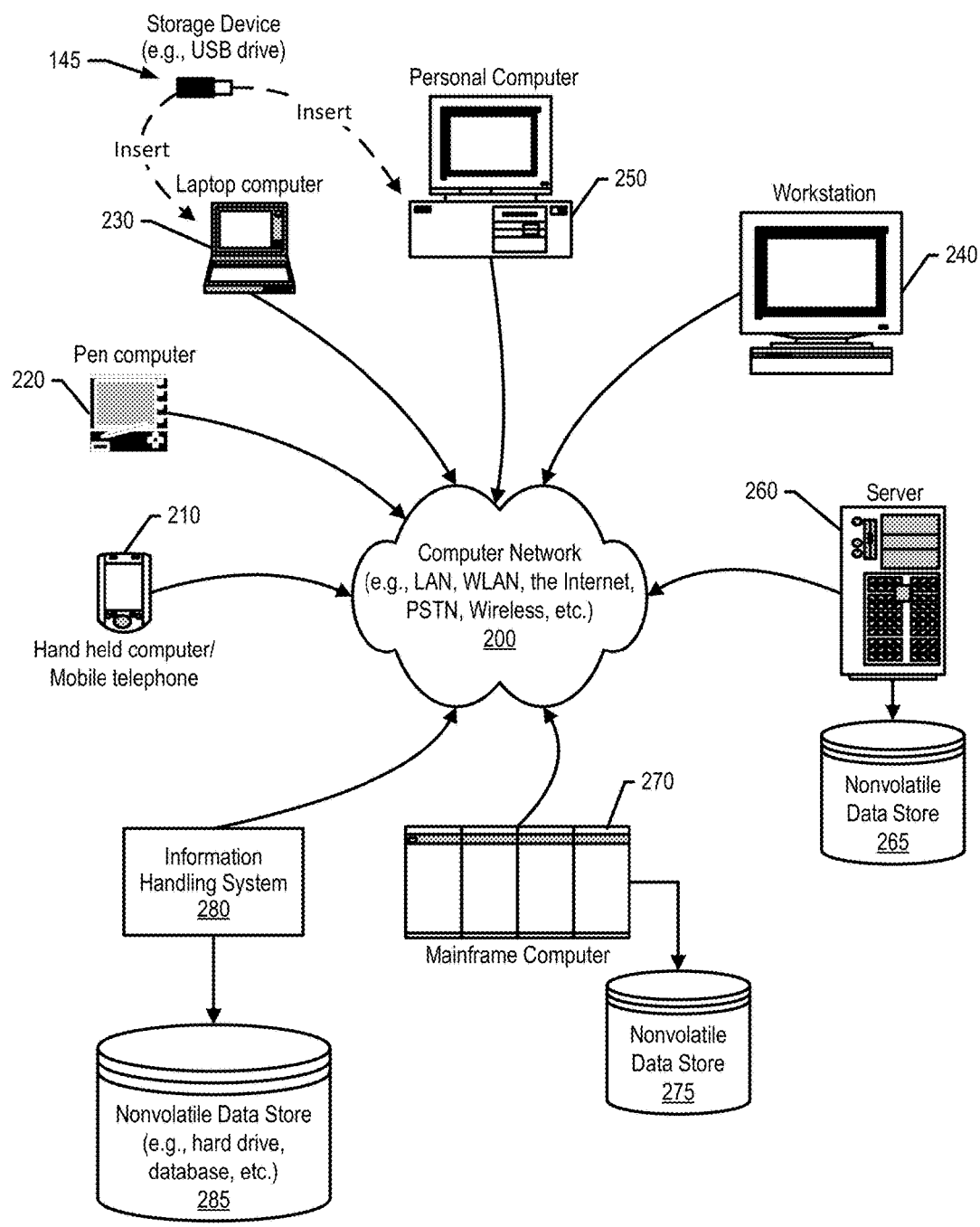
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 10 depict an approach that can be executed on an information handling system. The information handling system discussed herein takes snapshots of services on an occasional basis due to the fact that taking snapshots requires a large amount of time and resources. During times between snapshots, the information handling system logs interservice API calls between services. When a service executing on a virtual machine fails, the information handling system restores the failed service to a point in time of its latest snapshot, and then uses the logged interservice API calls to automatically reconnect the services and restore the services accordingly.

Figure 3:
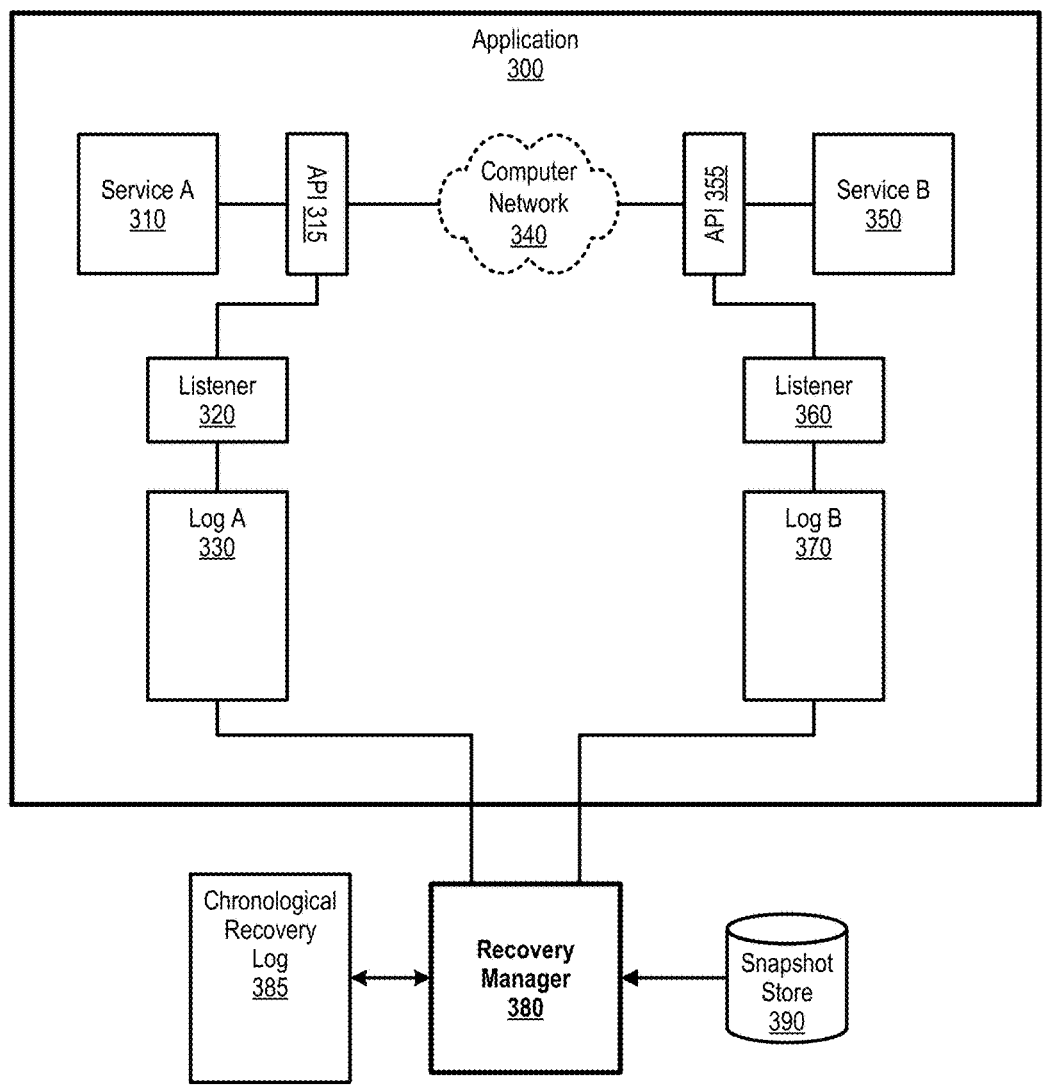
FIG. 3 is an exemplary diagram depicting a recovery manager that captures messages (API calls) sent between virtual machines and restores services executing on the virtual machines as required using snapshots of the services and the captured API calls.

FIG. 3 is an exemplary diagram depicting a recovery manager that captures messages (API calls) sent between virtual machines and restores services executing on the virtual machines as required using snapshots of the services and the captured API calls. As disclosed herein, recovery manager 380 uses interservice RESTful API calls to minimize the need for constantly capturing snapshots of the services. Those skilled in the art would understand that recovery manager 380 may capture other types of interservice messages to perform the steps described herein.

Application 300 includes service A 310 and service B 350, each executing on a virtual machine not shown (e.g., virtual machine A and virtual machine B). Service A 310 sends/receives messages through API 315, and service B 350 sends/receives messages through API 355. The messages traverse through computer network 340 to their destination. As those skilled in the art can appreciate, application 300 may have more or less services than what is depicted in FIG. 3. At times, such as once per day, the information handling system takes snapshots of services (virtual machines) executing in application 300, which are stored in snapshot store 390.

Listener 320 and listener 360 are software modules that monitor API 315 and API 355, respectfully, for API calls sent/received by their respective service. Listener 320 and listener 360 log the API calls as log entries in log A 330 and log B 370, respectfully (see FIG. 4 and corresponding text for further details). Each of the log entries includes a time stamp. In one embodiment, the listeners log each API call and then recovery manager 380 filters out the API calls that do not change states of services.

When services fail, recovery manager 380 retrieves the most recent snapshot of the services from snapshot store 390 and restores the failed services to the point in time of their snapshots. Recovery manager 380 then retrieves logs (e.g., log A 330 and log B 370) corresponding to the failed services and sorts the log entries of all the logs in chronological order. Recovery manager 380 then stores the sorted log entries as chronological recovery log entries in chronological recovery log 385 (see FIG. 6 and corresponding text for further details).

Recovery manager 380 then reissues the first (oldest) API call to the corresponding service from chronological recovery log 385 and captures resultant API calls that resulted from the first API call. For example, the first API call may be service A 310 calling service B 350, which invokes service B 350 to send an API call to another service (see FIGS. 5-7 and corresponding text for further details). Recovery manager then removes any log entries in chronological recovery log 385 that match the resultant API calls to avoid reissue duplication. For example, "Nova create" may be the oldest API call that, in turn, calls Neutron. In this example, the log for the Neutron API is matched in the saved log entries and removed from chronological recovery log 385.

In one embodiment, recovery manager 380 evaluates changes in timestamps and UUIDS (universally unique identifiers). In a simple implementation, recovery manager 380 may ignore timestamps, but in advanced implementations, recovery manager 380 may use timestamps for validation to ensure that contained API calls are made in approximately the same timeframe.

In another embodiment, some API calls are asynchronous calls and resultant API calls may not succeed until these complete. In this embodiment, the asynchronous API calls will be identified and either the resultant API calls will be performed until they succeed (or normalized return data matches) and log entries are not eliminated until this occurs. For example, an asynchronous Nova create server API request immediately responds with success but a server status needs to be requested to be sure if its success. The logs would show the Nova create server API request followed by "Get Status logs" until the status is complete. The Nova create service can also call other services it needs as part of server Create anytime during that period of time.

In another embodiment, even failing API call requests are reissued since they may call multiple services, some of which are successful and some that fail. In this embodiment, recovery manager 380 still captures resultant API calls and removes log entries from chronological recovery log 385 that match. In yet another embodiment, a pattern of logs associated with failures returned from a log may be captured and, once the pattern is identified/confirmed, recovery manager 380 uses the pattern to eliminate the logs associated with the failed API call. In yet another embodiment, a common request ID may be associated with each contained API call and recovery manager 380 removes the failed API calls and the associated logs that include the common request ID.

In yet another embodiment, a new recovery mode may be added to services to indicate that requests being sent are part of a restoration process. This allows services that did not crash to either generate the same original response containing the original UUID since the item still exists with that UUID. In this embodiment, a recovery indicator may be included in the header or the previous response may be included as part of the reissued call (see FIG. 8 and corresponding text for further details).

In a cloud-based environment where clouds run independently but are linked, the API calls between the clouds may be given additional information that it is being called as part of a recovery and, therefore, a receiving service can find what was created for the original request and reconnect to it instead of having to recreate what is being requested. For example, a service may ask that a volume be created and the service determines that the service already created the volume. Instead of creating a new one and returning that UUID, the service simply returns the UUID of the already created volume.

In another embodiment, recovery manager 380 may modify recovery code to inform a service that an API call is a recovery request to allow the service to make a recovery facade over the data which keeps track of the current recovery state while maintaining the actual state. In this embodiment, once the recovery is completed, the recovery state should match the actual state and the facade is removed.

FIG. 4 is an exemplary diagram depicting log file that includes log entries of interservice API calls. Entry 400 is a log of a request to GET information about a volume (UUID=779005e51ccc4a07b1ace144a8aa59d3). Entry 410 is a log of data specified in the GET request (entry 400.

Entry 420 is a log of a response to the GET request. Entry 430 is a log of a POST (create) request to create a new volume. And, entry 440 is a log of data specified for the creation of the new volume.

Figure 5:
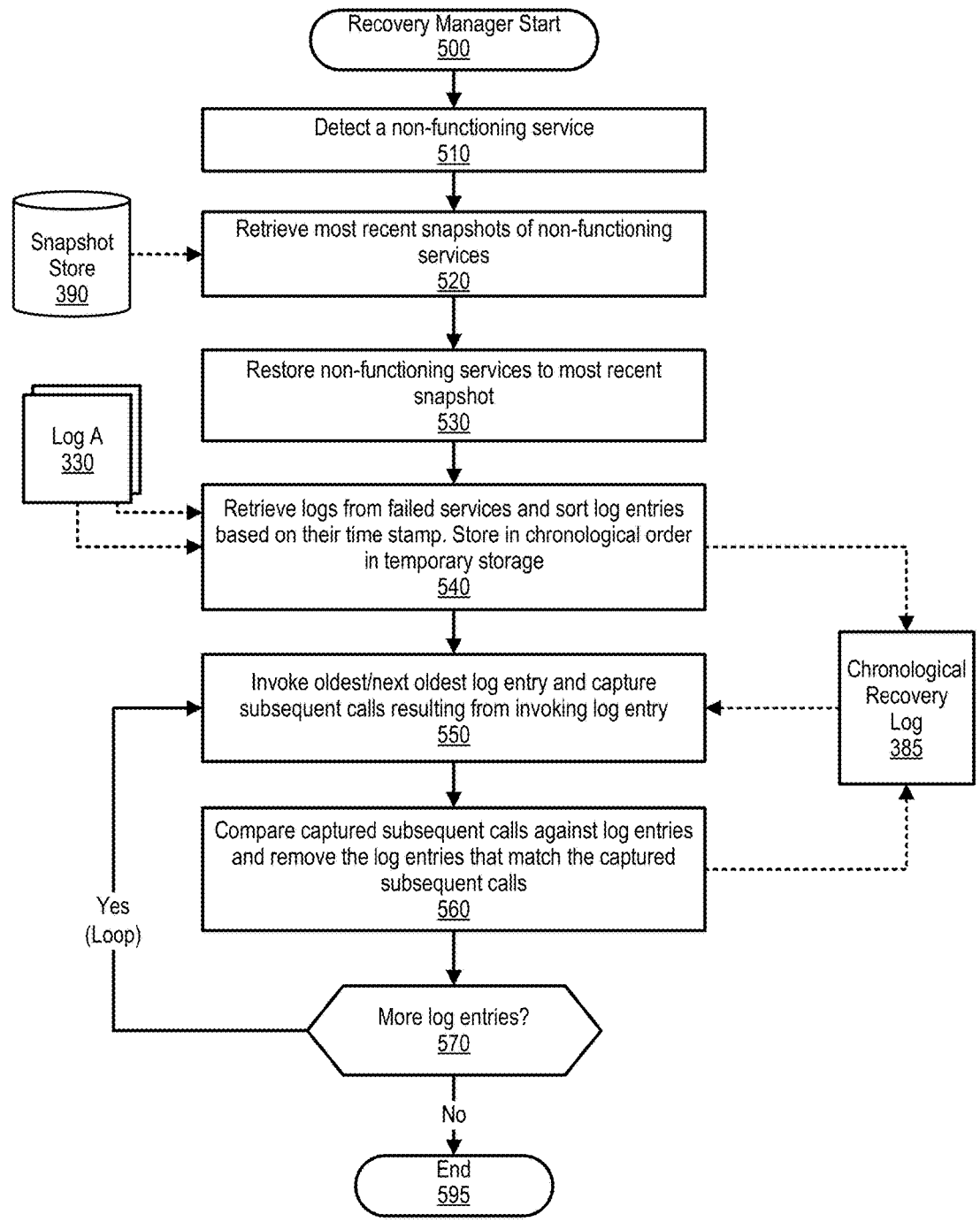
FIG. 5 is an exemplary flowchart depicting steps taken by a recovery manager to restore failed services.

FIG. 5 is an exemplary flowchart depicting steps taken by a recovery manager to restore failed services. FIG. 5 processing commences at 500 whereupon, at step 510, the process detects one or more non-functioning services (virtual machines). At step 520, the process retrieves the most recent snapshots corresponding to the non-functioning services from snapshot store 390. As discussed previously, the process captures snapshots of the virtual machines, for example, at pre-defined intervals, such as every day at 2:00 AM. At step 530, the process restores the non-functioning services to their most recent snapshot. In one embodiment, the process waits to restore the non-functioning services until after the process retrieves log information (step 540 discussed below).

Figure 6:
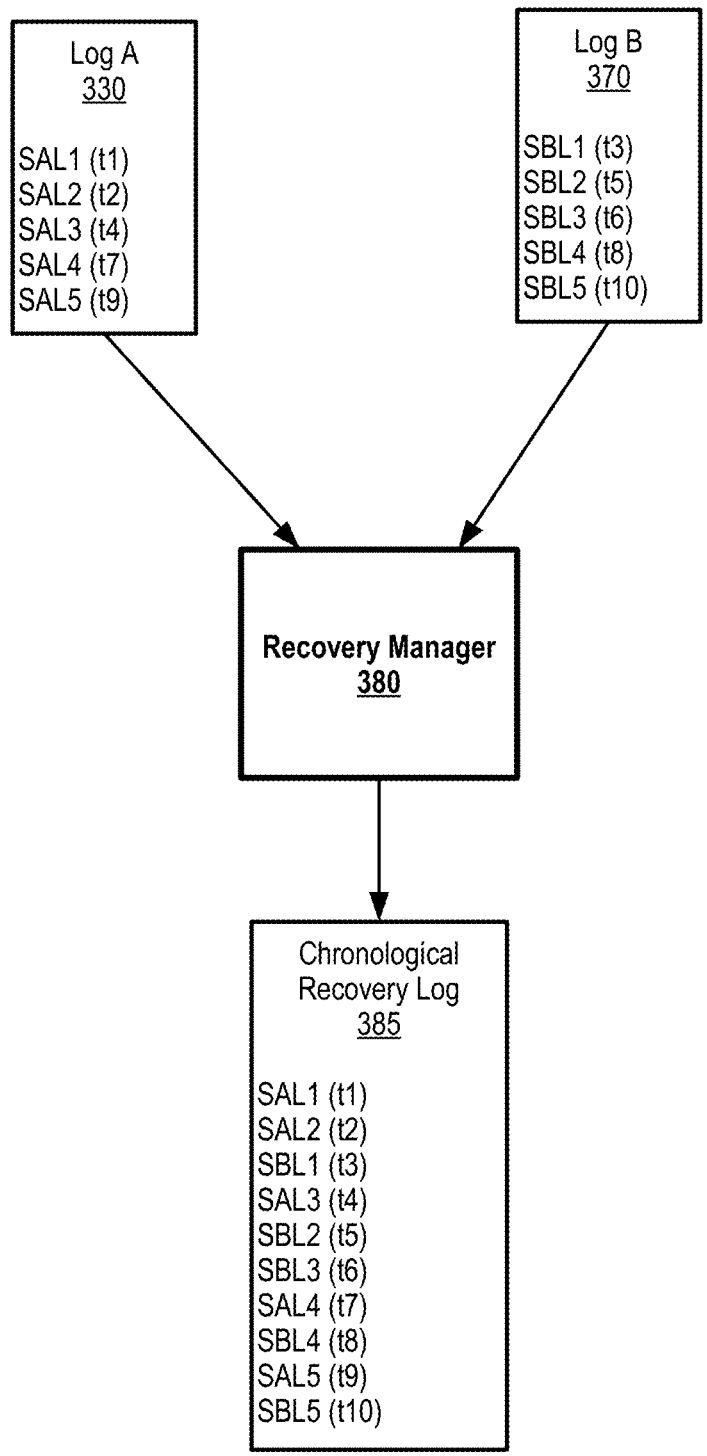
FIG. 6 is an exemplary diagram depicting a recovery manager organizing log entries from two different services in chronological order.

At step 540, the process retrieves logs 545 corresponding to the failed services, such as logs 330 and 370 shown in FIG. 3, and organizes the logs' log entries based on their time stamp (see FIG. 6 and corresponding text for further details). The process then stores the log entries in chronological order in chronological recovery log 385.

At step 550, the process reissues the oldest log entry from temporary storage 525 and captures resultant API calls from the service, or other services, in response to reissuing the oldest log entry. For example, recovery manager 380 may reissue an API call to service B 350 that, in turn, causes service B 310 to send an API call to another service (see FIG. 7 and corresponding text for further details).

Figure 7:
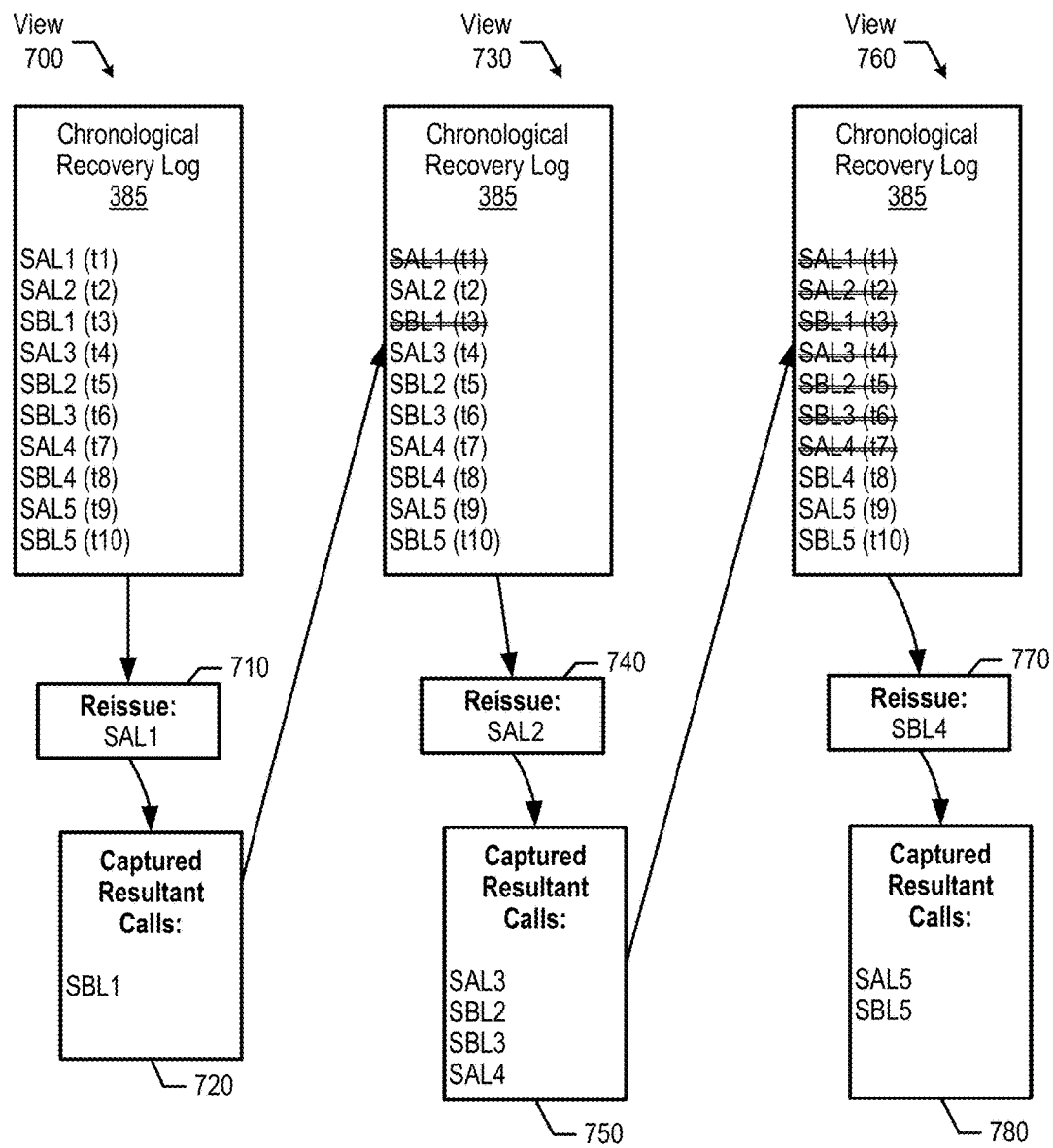
FIG. 7 is an exemplary diagram depicting log entries sorted in chronological recovery log being reissued by a recovery manager.

Next, at step 560, the process compares the captured resultant API calls against the existing log entries stored in chronological recovery log 385 and removes the log entries that match the resultant API calls to avoid reissue duplication (see FIG. 7 and corresponding text for further details).

The process then determines as to whether the chronological recovery log includes any more log entries after the duplicate log entries are removed (decision 570). If there are more log entries, then decision 570 branches to the 'yes' branch which loops back to invoke the next log entry in chronological order. This looping continues until there are no more log entries in chronological recovery log 385, at which point decision 570 branches to the 'no' branch exiting the loop. FIG. 5 processing thereafter ends at 595.

FIG. 6 is an exemplary diagram depicting a recovery manager organizing log entries from two different service logs in chronological order. Recovery manager 380 detects that service A 310 and service B 250 have failed and retrieves log A 330 and log B 370. The diagram in FIG. 6 shows five log entries in log A 330 and five log entries in log B 370. Those skilled in the art would understand that more or less log entries may be included in log A 330 or log B 370.

Each of the log entries includes a time stamp "tx" and, to simplify the drawing, the time stamps are incremented chronologically. As such, t1 is a point in time before t2, t2 is a point in time before t3, and so on. Recovery manager 380 combines the log entries from both logs in chronological order as shown in chronological recovery log 385. As can be seen, service A log 1 (SAL1) with time stamp t1 is first, followed by SAL2 with time stamp t2. Then, service B log 1 (SBL1) is next with time stamp t3, followed by SAL3 with time stamp t4, and so on. Recovery manager 380 is now ready to begin to reissuing the API calls to corresponding services in chronological order. In one embodiment, recovery manager 380 ignores log entries in the retrieved logs that are not API calls.

FIG. 7 is an exemplary diagram depicting log entries sorted in chronological recovery log being reissued by recovery manager 380. View 700 shows chronological recovery log 385 at a point after being populated by recovery manager 380 as shown in FIG. 6. Recovery manager 380 reissues service A Log 1 API call (710) and captures resultant API calls SBL1 (720) being sent by services (both service A 310 and other services). View 730 shows that recovery manager 380 removed SAL1 and SBL1 from chronological recovery log 385.

Next, recovery manager 380 reissues the next API call in order, which is SAL2 (740). Recovery manager 380 captures resultant API calls SAL3, SBL2, SBL3, and SAL4 (750) that were sent by services as a result of reissuing SAL2. View 760 shows that recovery manager 380 removed SAL2, SAL3, SBL2, SBL3, and SAL4 from chronological recovery log 385.

At this point, the next API call in order is SBL4, which recovery manager 380 reissues (770). Recovery manager 380 then captures resultant API calls SAL5 and SBL5 (780) that resulted from reissuing SBL4. In turn, recovery manager 380 removes SBL4, SAL5, and SBL5 from chronological recovery log 385 and no other API calls remain in chronological recovery log 385 to be reissued. At this point, the computer system is restored to a point right before the service failures.

Figure 8:
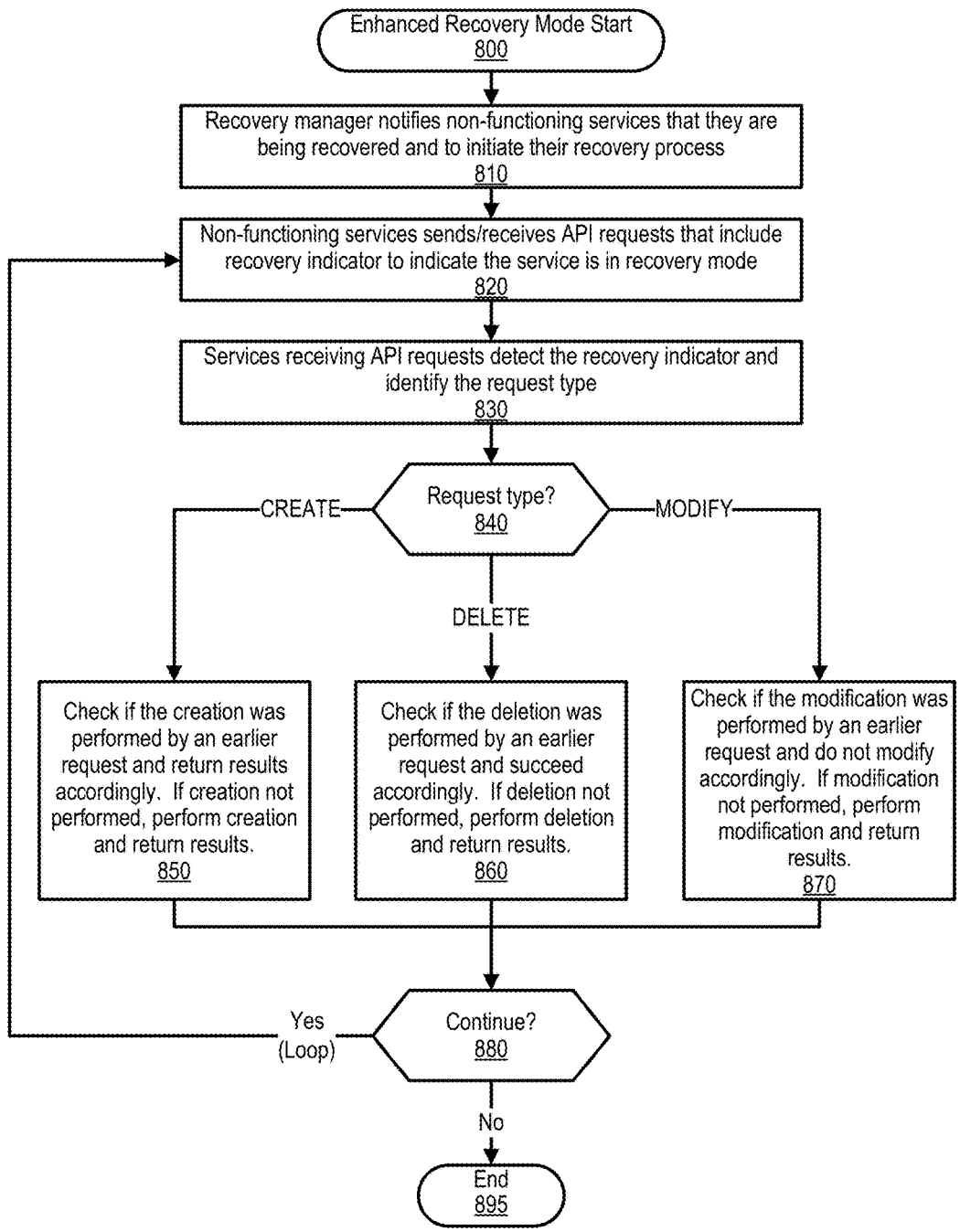
FIG. 8 is an exemplary flowchart depicting another embodiment of steps taken by the recovery manager to restore a computer system.

FIG. 8 is an exemplary flowchart depicting another embodiment of steps taken by the recovery manager to restore a computer system. In this embodiment, API calls may include a "recovery indicator" that informs a recipient service that the API call corresponds to a recovery operation. In this embodiment, the services may add support to add the recovery indicator to API calls and passing the recovery indicator on to the services it calls (resultant API calls).

In another embodiment, the service may call recovery manager 380 before it calls out to another service to get information as to what the service should add to the API call. For example, the service being called by the recovering service may have a fixed Internet Protocol (IP) address which it then directs to the dynamic IP address of the actual service. In this example, recovery manager 380 may utilize a mechanism such as high availability proxy (HAProxy) to temporarily intercept the API requests and modify them with recovery information as appropriate.

FIG. 8 processing commences at 800 whereupon, at step 810, the process notifies non-functioning services that they are being recovered and to initiate their recovery process. At step 820, the non-functioning services send/receive API requests that include recovery indicators (e.g., in the header) to indicate the API requests are part of a recovery operation. At step 830, the services receiving the API requests detect the recovery indicator and identify the request's corresponding request type.

The process determines the request type (decision 840) and, if the request type is CREATE, decision 840 branches to the CREATE branch. At step 850, the process checks whether the requested creation was performed by an earlier request and return results accordingly. However, if the creation was not yet performed, the process performs the creation and returns results accordingly. For example, a service may receive a Create volume request and analyze volumes already created. The service may also use the timestamp information in the log to analyze the Create timestamp of the volume to help confirm that a particular volume is the correct volume.

Referring back to decision 840, if the request type is DELETE, decision 840 branches to the DELETE branch. At step 860, the process checks whether the requested deletion was performed by an earlier request and succeeded. If the deletion was not performed, the process performs the requested deletion and returns the results.

Referring back to decision 840, if the request type is MODIFY, decision 840 branches to the MODIFY branch. At step 870, the process checks whether the requested modification was performed by an earlier request and does not perform the requested modification if so. However, if the requested modification has not yet been performed, the process performs the requested modification and returns results.

The process determines as to whether to continue (decision 880). If the process should continue, such as if additional recovery API calls are required, then decision 880 branches to the 'yes' branch which loops back to send the next recovery API call. This looping continues until there are no more recovery API calls to invoke, at which point decision 880 branches to the 'no' branch exiting the loop. FIG. 8 processing thereafter ends at 895.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
  retrieving a snapshot of a first service in response to determining that the first service has failed, wherein the snapshot was captured at a point in time prior to the failure of the first service;
  retrieving a first log corresponding to the first service that includes a log entry of a message sent between the first service and a second service, wherein the message was sent subsequent to the capturing of the snapshot; and
  restoring the first service using the snapshot and the message, wherein the restoring further comprises:
    creating a recovery message that includes the message and a recovery indicator that indicates that the recovery message is a reissuing of a previously issued message to perform an action; and
    issuing the recovery message to the second service.

2. The method of claim 1 wherein the first log includes a set of first log entries that includes the log entry, the method further comprising:
  retrieving a second log corresponding to the second service in response to detecting that the second service has also failed, wherein the second log includes a set of second log entries; and
  combining, in chronological order, the set of first log entries with the set of second log entries, resulting in a set of chronological recovery log entries.

3. The method of claim 2 wherein the restoring comprises sending the message to the second service, the method further comprising:
  detecting that the second service transmitted a different message in response to receiving the message;
  matching the different message against one of the chronological recovery log entries; and
  removing the matched chronological recovery log entry from the set of chronological recovery log entries.

4. The method of claim 3 further comprising:
  subsequent to removing the matched chronological recovery log entry, selecting one of the chronological recovery log entries that is next in chronological order from the message; and
  issuing a subsequent message that is included in the selected chronological recovery log entry.

5. The method of claim 1 further comprising:
  determining, by the second service, whether the action has already been executed by the second service;
  in response to determining that the action has already been executed, returning results of the action without re-executing the action; and
  in response to determining that the action has not yet been executed:
    executing the action; and
    returning results of the action.

6. The method of claim 1 wherein:
  the first service executes on a first virtual machine and the second service executes on a second virtual machine; and
  the message is a RESTful API call from the first service to the second service.

7. An information handling system comprising:
  one or more processors;
  a memory coupled to at least one of the processors;
  a set of computer program instructions stored in the memory and executed by at least one of the one or more processors in order to perform actions of:
    retrieving a snapshot of a first service in response to determining that the first service has failed, wherein the snapshot was captured at a point in time prior to the failure of the first service;
    retrieving a first log corresponding to the first service that includes a log entry of a message sent between the first service and a second service, wherein the message was sent subsequent to the capturing of the snapshot; and
    restoring the first service using the snapshot and the message, wherein the restoring further comprises:
      creating a recovery message that includes the message and a recovery indicator that indicates that the recovery message is a reissuing of a previously issued message to perform an action; and
      issuing the recovery message to the second service.

8. The information handling system of claim 7 wherein the first log includes a set of first log entries that includes the log entry, and wherein at least one of the one or more processors perform additional actions comprising:

retrieving a second log corresponding to the second service in response to detecting that the second service has also failed, wherein the second log includes a set of second log entries; and combining, in chronological order, the set of first log entries with the set of second log entries, resulting in a set of chronological recovery log entries.

9. The information handling system of claim 8 wherein the restoring comprises sending the message to the second service, and wherein at least one of the one or more processors perform additional actions comprising:

detecting that the second service transmitted a different message in response to receiving the message;

matching the different message against one of the chronological recovery log entries; and removing the matched chronological recovery log entry from the set of chronological recovery log entries.

10. The information handling system of claim 9 wherein at least one of the one or more processors perform additional actions comprising:

subsequent to removing the matched chronological recovery log entry, selecting one of the chronological recovery log entries that is next in chronological order from the message; and issuing a subsequent message that is included in the selected chronological recovery log entry.

11. The information handling system of claim 7 wherein at least one of the one or more processors perform additional actions comprising:

determining, by the second service, whether the action has already been executed by the second service;

in response to determining that the action has already been executed, returning results of the action without re-executing the action; and in response to determining that the action has not yet been executed:
executing the action; and
returning results of the action.

12. The information handling system of claim 7 wherein at least one of the one or more processors perform additional actions comprising:

the first service executes on a first virtual machine and the second service executes on a second virtual machine; and the message is a RESTful API call from the first service to the second service.

13. A computer program product stored in a computer readable storage medium, comprising computer program code that, when executed by an information handling system, causes the information handling system to perform actions comprising:

retrieving a snapshot of a first service in response to determining that the first service has failed, wherein the snapshot was captured at a point in time prior to the failure of the first service;

retrieving a first log corresponding to the first service that includes a log entry of a message sent between the first service and a second service, wherein the message was sent subsequent to the capturing of the snapshot; and restoring the first service using the snapshot and the message, wherein the restoring further comprises:

creating a recovery message that includes the message and a recovery indicator that indicates that the recovery message is a reissuing of a previously issued message to perform an action; and issuing the recovery message to the second service.

14. The computer program product of claim 13 wherein the first log includes a set of first log entries that includes the log entry, and wherein the information handling system performs further actions comprising:

retrieving a second log corresponding to the second service in response to detecting that the second service has also failed, wherein the second log includes a set of second log entries; and combining, in chronological order, the set of first log entries with the set of second log entries, resulting in a set of chronological recovery log entries.

15. The computer program product of claim 14 wherein the restoring comprises sending the message to the second service, and wherein the information handling system performs further actions comprising:

detecting that the second service transmitted a different message in response to receiving the message;

matching the different message against one of the chronological recovery log entries; and removing the matched chronological recovery log entry from the set of chronological recovery log entries.

16. The computer program product of claim 15 wherein the information handling system performs further actions comprising:

subsequent to removing the matched chronological recovery log entry, selecting one of the chronological recovery log entries that is next in chronological order from the message; and issuing a subsequent message that is included in the selected chronological recovery log entry.

17. The computer program product of claim 13 wherein the information handling system performs further actions comprising:

determining, by the second service, whether the action has already been executed by the second service;

in response to determining that the action has already been executed, returning results of the action without re-executing the action; and in response to determining that the action has not yet been executed:
executing the action; and
returning results of the action.

* * * * *